United States Patent [19]

Spearman

[11] Patent Number: 5,250,179

[45] Date of Patent: Oct. 5, 1993

[54] COMPACTABLE FILTER AND COMPACTABLE FILTER MOUNTING MEANS

[75] Inventor: Michael R. Spearman, St. Paul, Minn.

[73] Assignee: Porous Media Corporation, St. Paul, Minn.

[21] Appl. No.: 859,023

[22] Filed: Mar. 27, 1992

[51] Int. Cl.⁵ .................. B01D 27/06; B01D 27/08
[52] U.S. Cl. ............................ 210/315; 210/317; 210/450; 210/484; 210/489; 210/493.2; 210/497.01
[58] Field of Search .............. 210/238, 315, 450, 452, 210/455, 456, 470, 484, 485, 489, 493.1, 493.5, 451, 317, 487, 497.01, 498; 55/498, 501

[56] References Cited

U.S. PATENT DOCUMENTS

| | | | |
|---|---|---|---|
| 2,220,706 | 11/1940 | Cantin | 210/164 |
| 2,269,461 | 1/1942 | Lehmberg | 128/146 |
| 3,078,650 | 2/1963 | Anderson | 55/337 |
| 3,505,794 | 4/1970 | Nutter et al. | 55/487 |
| 3,716,436 | 2/1973 | Pall et al. | 156/218 |
| 4,075,106 | 2/1978 | Yamazaki | 210/487 |
| 4,130,487 | 12/1978 | Hunter et al. | 210/85 |
| 4,154,688 | 5/1979 | Pall | 210/487 |
| 4,184,966 | 1/1980 | Pall | 210/493 |
| 4,464,263 | 8/1984 | Brownell | 210/484 |
| 4,522,719 | 6/1985 | Kuwajima et al. | 210/457 |
| 4,669,167 | 6/1987 | Asterlin | 210/238 |
| 4,878,930 | 11/1989 | Mannisco et al. | 55/493 |
| 4,946,598 | 8/1990 | Murphy et al. | 210/456 |
| 4,956,089 | 9/1990 | Hurst | 210/493.5 |
| 5,015,376 | 5/1991 | Picek | 55/498 |
| 5,045,194 | 9/1991 | Gershenson | 210/452 |

FOREIGN PATENT DOCUMENTS

| | | | |
|---|---|---|---|
| 441045 | 8/1991 | European Pat. Off. | 55/498 |
| 2192810 | 1/1988 | United Kingdom | 210/493.5 |

OTHER PUBLICATIONS

3m Brand Liquid Filter Cartridges, Sales brochure, 1989

Primary Examiner—Matthew O. Savage
Attorney, Agent, or Firm—Jacobson & Johnson

[57] ABSTRACT

A compactable or incinerateable non-resilient, coreless, cylindrical filter element including an annular pleated filter media having rigid end caps which are sealingly bonded to the pleated filter media with the exterior of the filter element surrounded by, but not part of, the filter element, a non-bypassing support cage comprising of perforated sheet formed into a cylinder and having an end cap at each end with the top flanged end of the support cage and the top end cap of the cylindrical filter element sealed between a support housing by sealing rings to thereby prevent leakage of fluid past the end of the filter media.

6 Claims, 4 Drawing Sheets

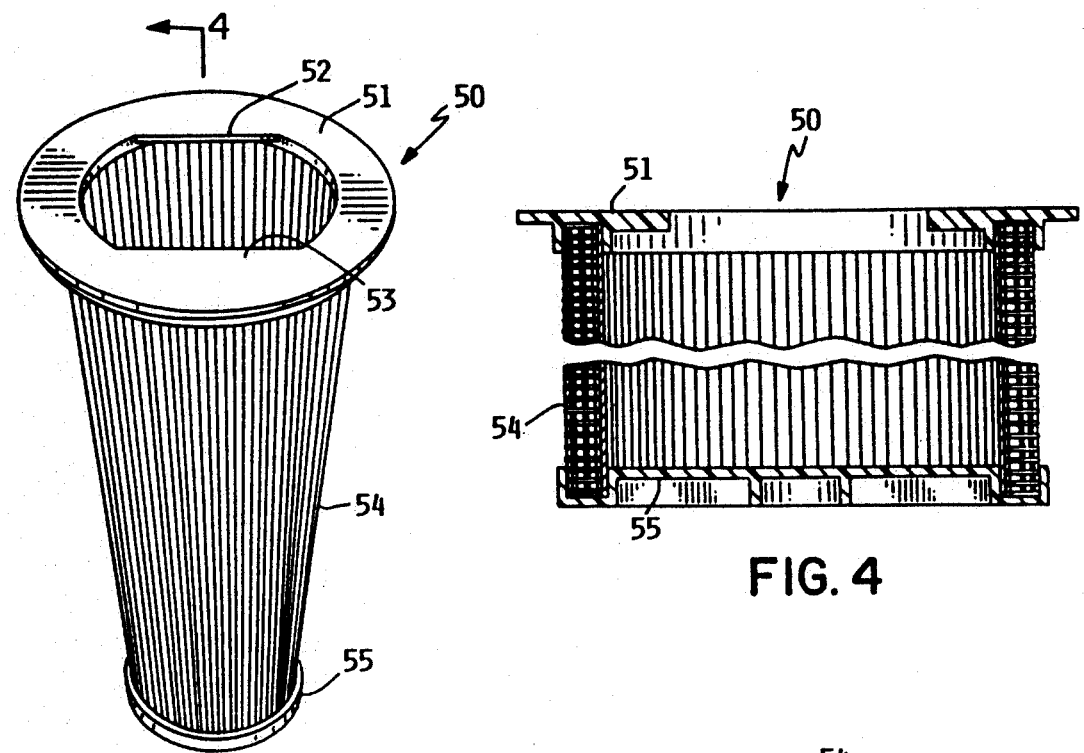
FIG. 3
FIG. 4
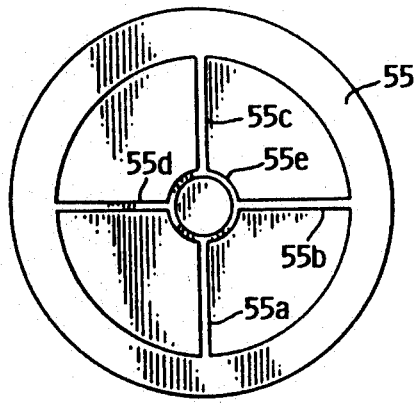
FIG. 5
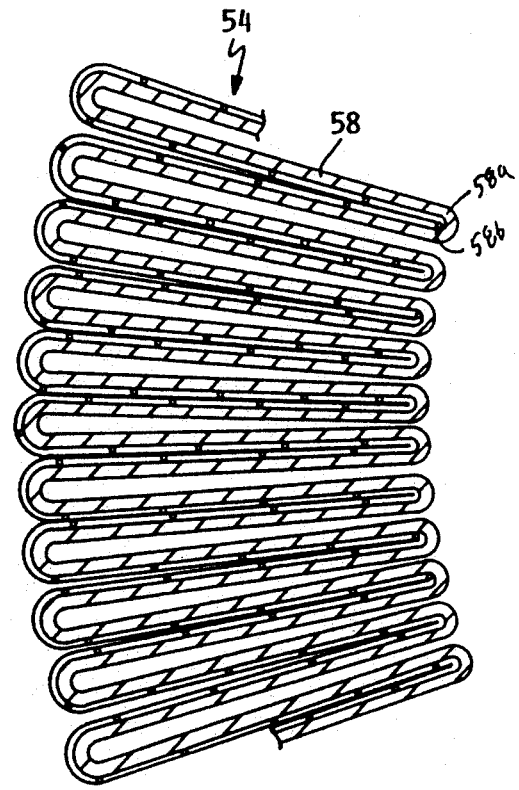
FIG. 6

COMPACTABLE FILTER AND COMPACTABLE FILTER MOUNTING MEANS

FIELD OF THE INVENTION

This invention relates generally to filters and, more specifically to fluid filter cartridges, means for sealing fluid cartridges and a method of mounting fluid filter cartridges in a housing.

BACKGROUND OF THE INVENTION

The concept of fluid filter cartridges, and more particularly cylindrical fluid filter cartridges for filtering fluids, is well known in the art. In general the cartridges contain a cylindrical outer support member, a pair of end caps, a filter media, an inner support core and an external screen. In distinction to bag-type filters, the filter cartridge retains its cylindrical shape so that the cartridge can be installed directly into a cylindrical housing. One of the advantages of filter cartridges is that the walls of the filter cartridge can be made with a pleated filter media. The pleated filter media has a large surface area for filtering material from the fluid. In contrast, bag-type filters have less given surface area for the same given size since they do not contain pleated sidewalls. The bag-type filters generally have been used in applications where disposal is a problem. That is, the bags are usually made of flexible material and occupy less disposal space than a filter cartridge since the filter cartridge includes an interior or exterior support screen that precludes the filter cartridge from being readily compacted for disposable. The present invention provides improvement to prior art filter cartridges by providing a compactable non resilient filter cartridge that contains no inner support core or external support screen. A combination of the lack of an inner support core and the use of crushable materials in the end housing and the filter material permits the filter cartridge to be compacted and thus less costly to dispose of.

SUMMARY OF THE INVENTION

Briefly, the present invention comprises a three-part compactable or incinerateable non-resilient, coreless, cylindrical filter element including an annular pleated filter media having end caps which are sealingly bonded to the pleated filter media. The exterior of the filter element is surrounded by, but not part of the filter element, by a non-bypassing support cage comprising a perforated sheet formed into a cylinder. The end cap of the support cage and the top end cap of the cylindrical filter element are sealed between a support housing by sealing rings to prevent leakage of fluid past the filter media.

BRIEF DESCRIPTION OF THE DRAWINGS

FIG. 3 is a perspective view of an alternate body of a filter cartridge;

FIG. 4 is a partial sectional view of the filter cartridge of FIG. 3;

FIG. 5 is a bottom view of the cartridge of FIG. 3;

FIG. 6 is an enlarged sectional view of the pleated filter media of the cartridge of FIG. 3;

DESCRIPTION OF THE PRIOR ART

U.S. Pat. No. 3,078,650 shows a typical filter cartridge having a sheet metal support core screen mounted in the interior of the filter cartridge.

U.S. Pat. No. 4,878,930 shows a filter cartridge that uses an interior wire support frame.

U.S. Pat. No. 4,522,719 shows a filter element having a cylindrical support tube located at the core of the filter.

U.S. Pat. No. 2,269,461 shows a respirator filter that uses a support core mounted to an end cap insert.

U.S. Pat. No. 2,220,706 shows a filter element with an outside metal cylinder.

U.S. Pat. No. 2,739,916 shows a filter cartridge having a rigid tubular member 13 with numerous perforations for supporting the filter element there around.

U.S. Pat. No. 4,075,106 shows plates for supporting the individual filter elements within the filter cartridge.

U.S. Pat. No. 3,716,436 shows a filter cartridge having a support core with perforations therein.

U.S. Pat. No. 3,505,794 shows a filter element with an interior support for the pleats.

U.S. Pat. No. 4,130,487 shows a filter cartridge with internal and external support cylinders.

U.S. Pat. No. 4,154,688 shows another filter element with an interior and exterior support members.

U.S. Pat. No. 4,184,966 shows a tubular element with an inner support core.

U.S. Pat. No. 4,464,263 shows a filter cartridge with an outer support core containing perforations.

The brochure titled 3M Brand Liquid Filter Cartridges shows a filter cartridge including an outer support screen and an inner support core. The cartridge, although incinerateable, is not readily compactable for disposal, since the filter cartridge contains an inner support core.

DESCRIPTION OF THE PREFERRED EMBODIMENT

Figures 1, 2:
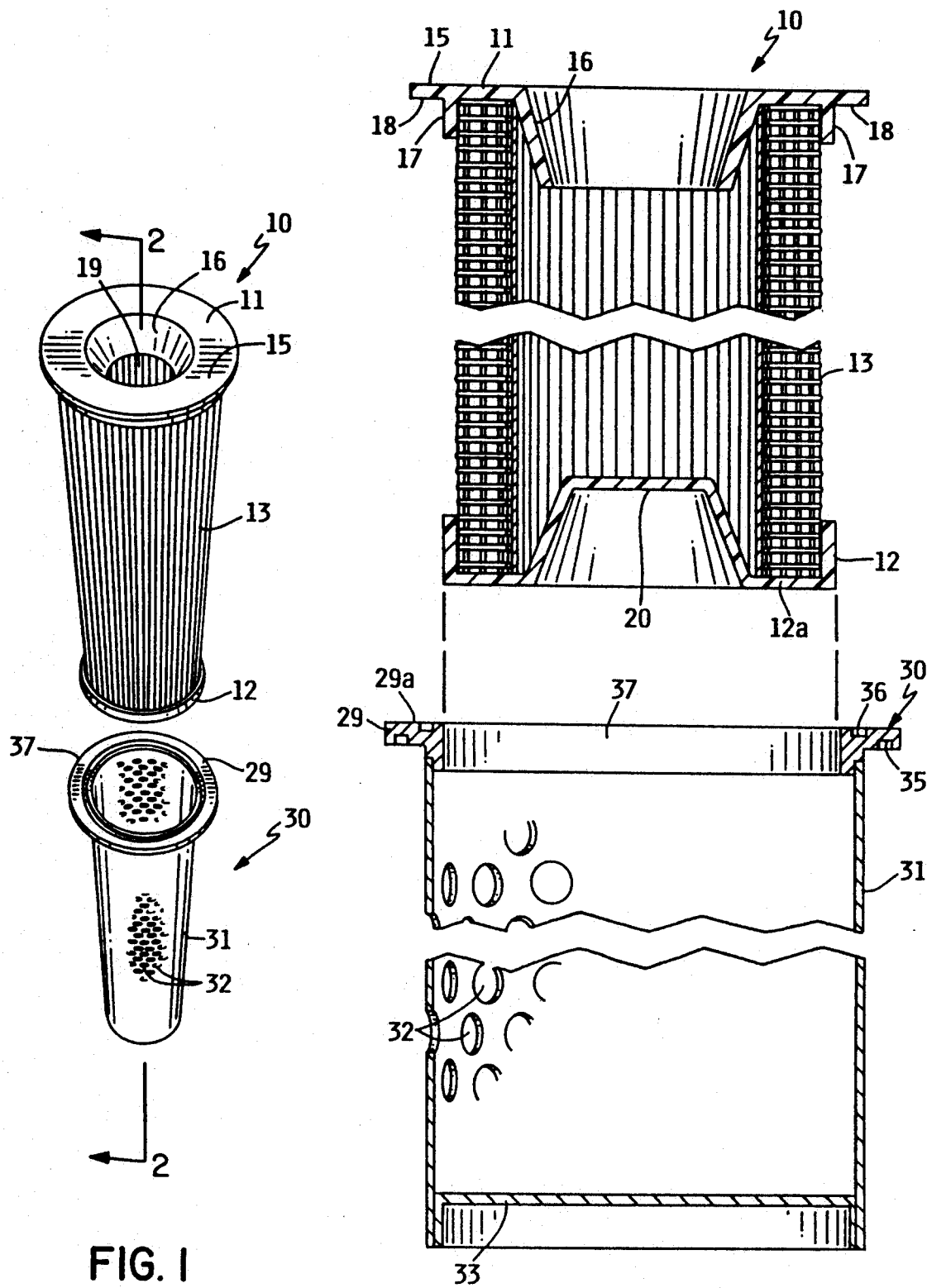
FIG. 1 is a perspective view of a filter cartridge and a support cage housing.
FIG. 2 is a vertical sectional view of a filter cartridge and housing of FIG. 1.

Referring to FIG. 1, reference numeral 10, generally identifies my improved crushable filter cartridge comprising a bottom end cap 12, a top end cap 11 and an annular coreless pleated cylindrical filter element 13. Top end cap 11 has a fluid inlet 19 therein with one end of annular coreless pleated cylindrical filter element 13 secured to end cap 11 and the other end secured to end cap 12. Coreless pleated cylindrical filter element 13 comprises a pleated filter media in an annular configuration and having rigid end caps 11 and 12 sealingly bonded to the ends of the pleated filter element 13. Cap 12 is closed to prevent fluid flow therethrough and the other end cap 11 is open to allow fluid to flow into the inside of filter element 13. In the preferred embodiment filter element 13 is preferable made of compactable and incinerateable materials such as synthetic fibers, polyethylene, polyester, nylon, cellulose, polypropylene, or glass fiber with a suitable resin binder. Similarly, end caps 11 and 12 are preferable made of compactable and incinerateable materials such as polyethylene, polypropylene or nylon.

The purpose of having the filter cartridge made entirely of compactable and incinerateable materials is to alleviate waste disposal problems. When the filter cartridge is made of incinerateable materials the user has the option of incinerating the entire filter cartridge or crushing the filter cartridge for placement in a land fill since the filter cartridge does not include an internal support core to hinder compaction. That is, the readily compactable filter cartridge 10 consists of only three three compactable structural components namely, end cap 11, end cap 12 and pleated filter element 13.

Besides being disposable, top end cap 11 of the present invention includes a sealing means that comprises a flange 18 that enables one to seal filter cartridge 10 to a support cage housing 30. The top end cap 11 includes a flat face 15 with a conical taper 16 to direct fluid into the central core of filter element 10. As pointed out filter cartridge 13 is unique in that it comprises only three structural components: top end cap 11, pleated filter element 13, and bottom end cap 12. FIG. 2 shows that no interior support core is located in filter cartridge 10 nor is there an exterior filter support screen located on the outside of cartridge 10. FIG. 1 and FIG. 2 illustrate a support cage housing or basket 30 for placing filter cartridge 10 therein. Basket 30 includes a cylindrical member 31 having perforations 32 therein.

The basket 30 and filter cartridge 10 are shown in greater detail in FIG. 2. End cap 12 includes a bottom section 12 with a concave insert 20 that extends only partially inward of pleated annular filter element 13. The top member 11 includes an outward extending flange 15 with a lower annular sealing face 18 and a radial sealing face 17 for forming sealing engagement with a support screen or non-by-passing support cage housing 30. Support cage housing 30 comprises a perforated metal or plastic sheet 31 formed into a cylinder having an end cap at each end. Bottom end cap 33 is flat and closed and top end cap 37 is open. End cap 37 includes an annular flanged lip 29, the bottom of lip 29 having an annular sealing ring groove 35 and the top of lip 29 having an annular sealing ring groove 36. Metal screen 31, which is integrally attached to top flange 29, forms a radial outward support for filter cartridge 10. That is, filter cartridge 10 does not contain any integral exterior support screen to prevent outward expansion of filter element 13 under fluid pressure but, instead, relies on radial support provided by screen 31.

The rigid injection molded end caps allows one a choice from a wide variety of moldable thermoplastic materials in order to provide chemical compatibility with the various fluids to be filtered. For example, the thermoplastic materials may be polypropylene, polyethylene, polyester, nylon, polytetrafluoreythylene, polyvinylidene fluoride, polyamideimide, as well as others. The use of positive sealing O-rings also provides more choices in selecting sealing materials than filters in which the end caps are made from a moldable elastomeric material and the filter media is potted into the end caps. The range of resilient, pottable elastomers is limited to compounds such as urethane and plastisols and cannot offer the wide range of chemical compatibility afforded by all of the different types of materials available in O-rings such as nitrile, silicone, ethylene propylene diene, polytetrafluoroethylene, neoprene, isoprene, fluorosilicone or perfluoroelastomers, as well as others.

Referring to FIG. 3, I show an alternate embodiment of a filter element which is identified by reference numeral 50. Filter element 50 is identical to filter element 10 except end cap 51 includes interior handles 52 and 53. Handles 52 and 53 comprise segment-like members formed on the interior portion of end cap 51. Filter cartridge 50 includes three incinerateable components: top end cap 51, filter media 54, and lower end cap 55. These features are more clearly shown in FIG. 4, and as evidenced therein, there in no outer support screen nor is there any interior support core for filter cartridge 50.

FIG. 5 illustrates the lower closed end cap 55 containing reinforcing ribs 55a, b, c, d, and e. FIG. 6 illustrates the enlarged section of the annular filter media 54 comprised of individual pleats 58 formed by a first large particle filter media 58b and a second small particle filter media 58a.

Figure 7:
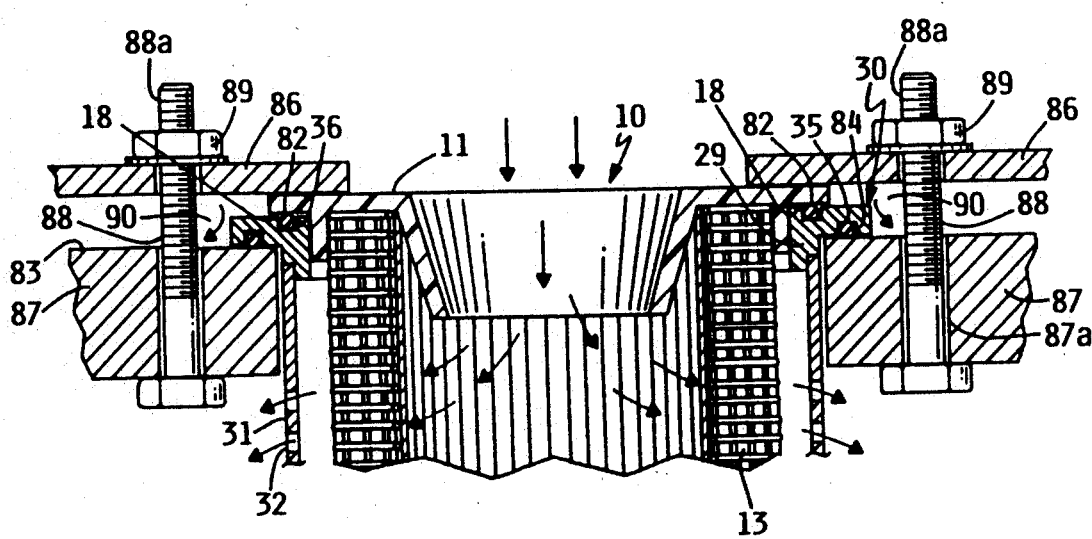
FIG. 7 is an enlarged view illustrating the support housing and filter locked in a sealing arrangement in the support housing.

The improved sealing means is shown in FIG. 7, reference numeral 10 identifies the coreless filter element of FIG. 2 located in support cage 30. Coreless filter element 10 is secured in housing 87 in a leak-proof relationship that prevents unfiltered fluid from escaping around the end of filter element 10. That is, coreless filter element 10 and support cage 30 coact to comprise means to prevent fluid from leaking past the edges of filter media 13 thus ensuring that the fluid being filtered will only flow in inlet 16 and radially outward through filter media 13. FIG. 7 shows the combination including a non-by-passing support cage 30 having a perforated metal or plastic sheet 31 formed into a cylinder and having annular flanged lip 29 secured in housing 87 by bolts 88, plate 86 and nuts 89. The bottom face of flanged lip 29 includes circular sealing ring groove 35. Located in sealing ring groove 35 is a circular sealing ring 84 to seal between housing 87 and the underside of flanged lip 29. The top face of flanged lip 29 also includes a circular sealing ring groove 36. Located in sealing ring groove 36 is a circular sealing ring 82 to seal between the top of flanged lip 29 and annular face 18 of filter cartridge 10.

FIG. 7 shows the inside diameter of support cage screen 31 being slightly larger than the outside diameter of coreless element 13 and lower end cap 12 thus allowing element 13 to slide inside support cage 30. Top flange 18 of end cap 11 and flanged lip 29 are shown tightly sandwiched between top plate 86 and lower plate 87 by bolts 88 each having a thread 88a and a nut 89. In normal operation of the unit, fluid flows (as indicated by the arrows) to the central region of filter cartridge 10 and then radially outward through the pleated walls of filter element 13 and the perforations 32. If, the inlet fluid is under greater pressure than the fluid outlet, the filter cartridge 13 without an inner support core or an inner support core may expands radially outward and rupture. To prevent rupture of the filter media I employ housing screen 31, which is reusable, to provide the necessary support to prevent filter element 13 from rupturing. To prevent leakage of unfiltered fluid I use sealing regions on both the flanged lip 29 and the sealing surface on end cap 11.

Thus cartridge 10 and support basket 30 coact with housing 87 to provide external support for filter cartridge 10 and flanged end cap 11 permits the sealing of the cartridge 10 to prevent leaking of unfiltered fluid around the end of cartridge element. That is, located around end caps 11 and 37 is an annular chamber 90 where fluid may enter. Note, the arrows in chanber 90 indicate that any unfiltered fluid escaping into chamber 90 does not leak to the outside of screen 31 because the sealing rings preclude passage of fluid past the end caps which are sealed in the housing.

Figure 8:
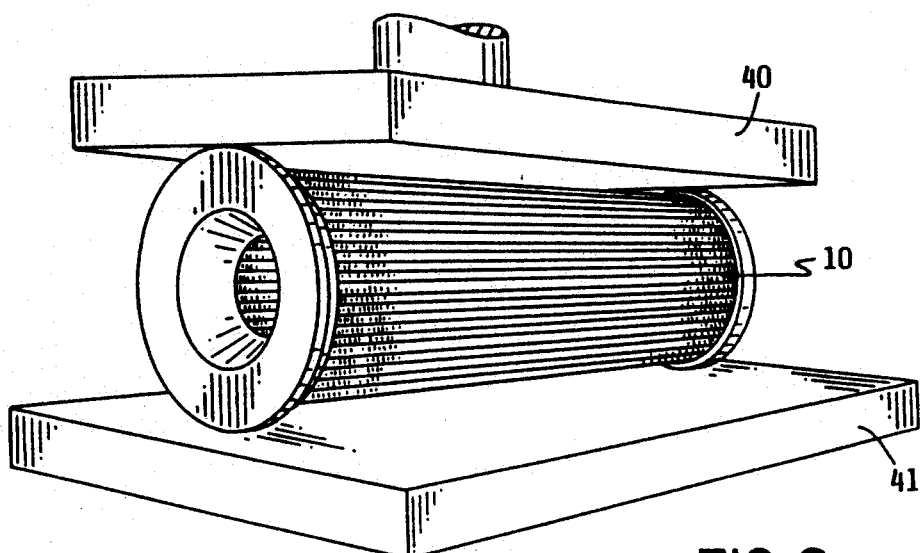
FIG. 8 shows a disposable cartridge about to be crushed.
Figure 9:
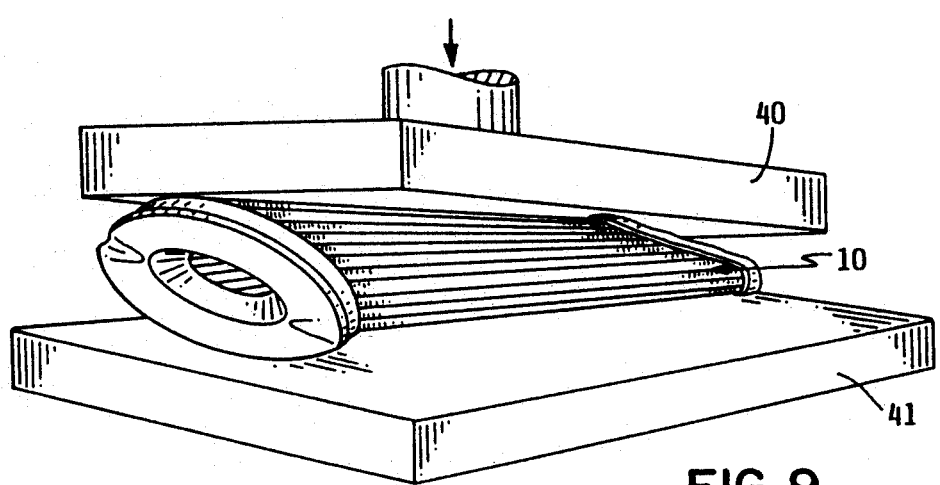
FIG. 9 shows the disposable cartridge being crushed.
Figure 10:
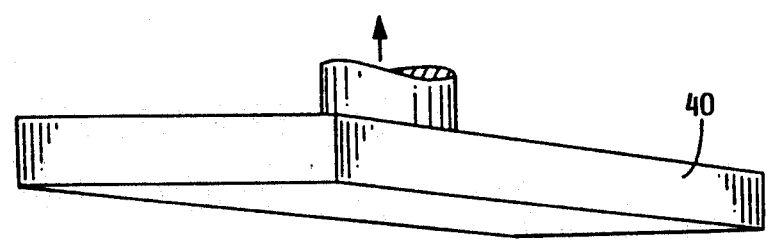
FIG. 10 shows the disposable cartridge in a compacted and crushed condition for disposal in a landfill.
Figure 10:
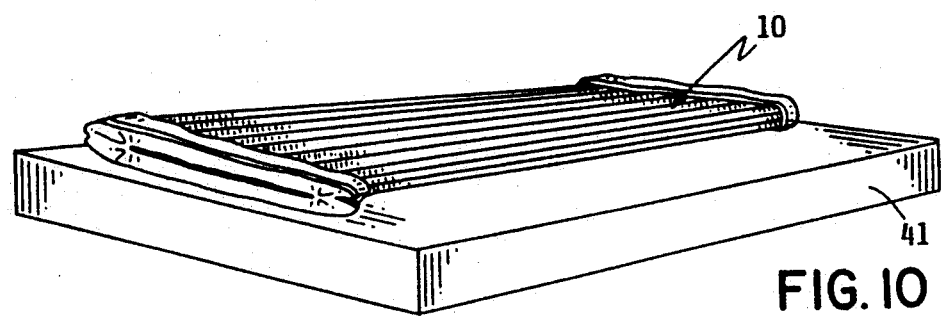

After filter cartridge 10 is spent, the filter cartridge is removed while the screen 31 remains in housing 87. Referring to FIGS. 8, 9, and 10, the spent filter cartridge 10 is shown located on a support plate 41 with a compactor plate 40 about to be lowered onto cartridge 10 to compact it for disposal. Since filter cartridge contains no internal core or external core the filter cartridge is readily compactable. FIG. 9 illustrates compactor plates 40 & 41 compacting coreless cartridge 10 into a compacted condition for disposal. FIG. 10 shows the compactor pates 40 & 41 separated with cartridge 10 in a compacted condition for disposal. Thus, one of the features of the present invention is an incinerateable or compactable non-resilient coreless filter cartridge formed from a pleated filter media with rigid but compactable end caps located sealingly bonded to the pleated filter media. Another feature of the invention is the non-bypassing support cage which is comprised of perforated metal or plastic sheet that prevents any unfiltered fluid from escaping because a pair of sealing rings on the support cage preclude passage of unfiltered around the end of the filter cartridge.

I claim:

1. A coreless filter element and a support cage in combination comprising:
   a non-by-passing support cage, said non-by-passing support cage including a perforated cylinder and a top end cap having a flanged lip, said flanged lip including a first side with a sealing ring groove and a sealing ring located therein, said flanged lip including a second side opposite of said first side with the second side including a sealing ring groove and a sealing ring located therein said non-by-passing support cage having an inside diameter;
   a pleated filter media for filtering particles from a fluid flowing therethrough, said pleated filter media having a central region for unfiltered fluid to enter a downstream side for filtered fluid to discharge therefrom, said pleated filter media including a first end, said pleated filter media having an outside diameter;
   a first end cap located on said first end of said pleated filter media;
   a flanged lip located on said first end cap of said pleated filter media, said flanged lip on said first end cap having a first annular sealing surface for forming sealing engagement around said first end cap located on said first end of said pleated filter media to seal said pleated filter media against said top end cap with the inside diameter of said non-by-passing-support cage being slightly larger than the outside diameter of the said pleated filter media to allow said pleated filter media to slide inside said non-by-passing support cage to permit said non-by-passing-support cage to provide radial support to said pleated filter element when pressurized fluid is forced through said pleated filter media and;
   means for securing said flanged lip located on said first end cap of said pleated filter media and said flanged lip on said non-by-passing support cage in a sealing relationship to prevent unfiltered fluid from escaping from said pleated filter media.

2. The filter media of claim 1 in which said first end cap is made from materials selected from the group consisting of polypropylene, nylon, polyester, and polyethylene.

3. The filter media of claim 1 in which the filter media is made from materials selected from the group consisting of cellulose, synthetic fibers, polyester, polytetrafluorethylene, polypropylene, and glass fiber.

4. The filter media of claim 1 in which the filter media is constructed entirely of incinerateable materials.

5. The filter media of claim 1 in which the pleated filter media is crushable to reduce the volume for disposal of the pleated filter media.

6. A non-by-passing support cage to prevent unfiltered fluid from by-passing a filter media comprising:
   a perforated cylinder filter support member having a first end and a second end, said perforated cylinder filter support member for providing external radial support;
   an end cap located on said first end of said perforated cylinder filter support member, said end cap having a flanged lip projecting radially outward of said perforated cylinder filter support member with said flanged lip including a first side with a sealing ring groove and a sealing ring to permit sealing of a filter cartridge flange thereto and a second side opposite of said first side with the second side including a sealing ring grove and a sealing ring to permit sealing of the second side to a support housing, said perforated cylinder filter support member and said sealing rings coacting to thereby prevent unfiltered fluid from escaping past said perforated cylinder filter support member without being filtered.

* * * * *